United States Patent [19]
Tezuka

[11] Patent Number: 4,887,174
[45] Date of Patent: Dec. 12, 1989

[54] DEVICE FOR LOADING RECORDING-MEDIUM HOUSING CASE

[75] Inventor: Nobuo Tezuka, Kanagawa, Japan

[73] Assignee: Canon Kabushiki Kaisha, Tokyo, Japan

[21] Appl. No.: 287,580

[22] Filed: Dec. 16, 1988

Related U.S. Application Data

[63] Continuation of Ser. No. 911,908, Sep. 25, 1986, abandoned.

[30] Foreign Application Priority Data

Sep. 30, 1985 [JP] Japan .................................. 60-216935

[51] Int. Cl.$^4$ ...................... G11B 5/012; G11B 23/03
[52] U.S. Cl. ................................. 360/99.06; 360/133
[58] Field of Search ............... 360/97.01, 99.01–99.03, 360/99.06, 133

[56] References Cited

U.S. PATENT DOCUMENTS 4,694,362 9/1987 Oosaka et al. ...................... 360/97

FOREIGN PATENT DOCUMENTS 3415412 12/1984 Fed. Rep. of Germany ........ 360/97
59-104755 6/1984 Japan ..................................... 360/97
60-57565 4/1985 Japan ..................................... 360/97

Primary Examiner—John H. Wolff
Attorney, Agent, or Firm—Robin, Blecker, Daley & Driscoll

[57] ABSTRACT

A device for loading a recording-medium housing case in an apparatus, which includes a locking member having a hook portion engageable with an engaging portion formed in said case and an energizing member for energizing said locking member in a case inserting direction to urge said case into said apparatus as well as in a locking direction to urge said locking member into engagement with said engaging portion of said case when said case has been inserted into said apparatus, in which as the case is moved to its recording or reproducing position said locking member is unlocked from locking engagement with said engaging portion of said case and then it is moved to its position where it cannot come into reengagement with said engaging portion.

21 Claims, 4 Drawing Sheets

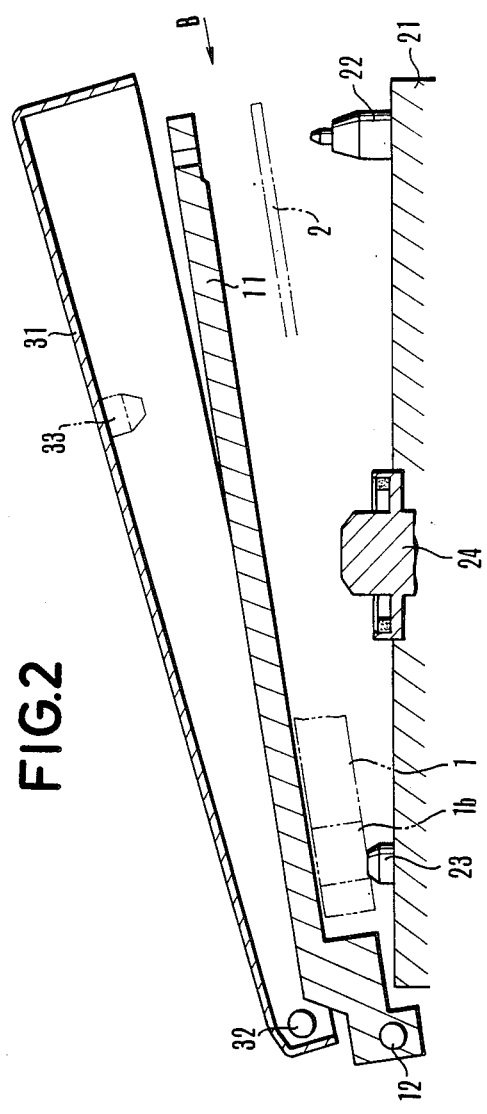
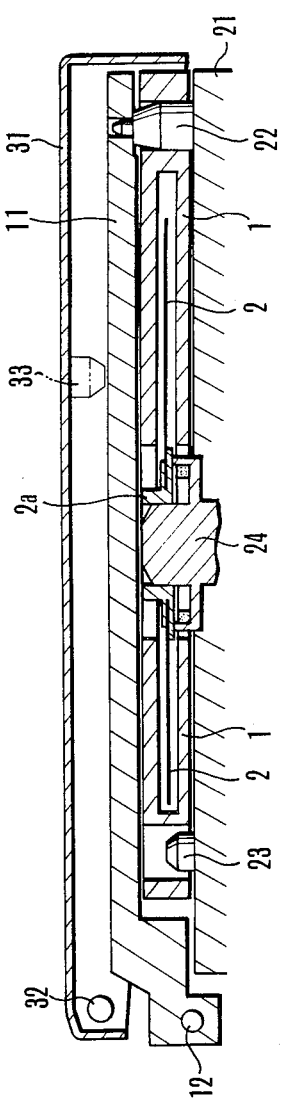
FIG.2
FIG.4 under the table at 4,887,174

DEVICE FOR LOADING RECORDING-MEDIUM HOUSING CASE

This application is a continuation of application Ser. No. 911,908, filed 9/25/86 now abandoned.

BACKGROUND OF THE INVENTION

1. Field of the Invention

The present invention relates to a device for loading a recording-medium housing case (generally called a "cassette" or "jacket" and hereinafter referred to as a "cassette" in the explanation of the prior arts and the embodiments of the invention) which is used to house a disc-type recording medium such as a rotary magnetic disc. Particularly, the present invention relates to a device of this kind which has a simple and compact construction.

2. Description of the Related Art

In a recording and/or reproducing apparatus using a recording medium, such as rotary magnetic discs, the medium is usually handled in such state that it is housed in a cassette.

In order to facilitate unloading of the cassette which has been loaded in a loading area of the recording and-/or reproducing apparatus, a device has been proposed to apply an ejecting force to the cassette to cause said cassette to be partly exposed from the loading area at the time of an unloading operation. This device includes a locking mechanism which acts to prevent the cassette from being ejected from said loading area by the action of the above-mentioned ejecting force at the time of insertion of the cassette. Said locking mechanism is unlocked at the time of an ejecting operation. (For example, see Japanese Laid-Open Patent Application Nos. 104755/1984 and 57565/1985).

In the conventional construction of the loading and unloading device of this type, including a cassette locking member to hold the cassette in the loading area of the recording and/or reproducing apparatus, the time of unlocking the engagement of the cassette and the cassette locking member is critical and it is required to provide a stopper to restrict the position of the cassette after the cassette has been unlocked from the locking member. Furthermore, there are many restrictions in construction and/or precision of the relative position between the cassette and a cassette positioning pin and the like. In order to assure accurate loading and unloading operation, the relative position between a cover member and its locking member is restricted. Also there is a problem of restriction in space which is required to enable the operation of the locking member. Under such circumstances it has been difficult to provide a compact construction of the recording and/or reproducing apparatus.

SUMMARY OF THE INVENTION

It is a general object of the present invention to eliminate the above-mentioned disadvantages of the conventional device of this kind.

It is a specific object of the present invention to provide a device for loading a recording-medium housing case in a recording and/or reproducing apparatus, in which locking and unlocking means for the recording medium housing case is simple in construction and reliable in operation and which provides a compact construction of the recording and/or reproducing apparatus.

In accordance with the present invention there is provided a device for loading a recording-medium housing case in an apparatus which comprises a locking member having a hook portion engageable with an engaging portion formed in said recording-medium housing case, energizing means for energizing said locking member in a case inserting direction to urge said case into said apparatus as well as in a locking direction to urge said locking member into engagement with said engaging portion of said case when said case has been inserted into said apparatus, and means for unlocking said locking member from locking engagement with said engaging portion of said case and then moving said locking member to an inactive position where it cannot come into reengagement with said engaging portion, as said case is moved to its recording or reproducing position.

The device as described above operates as follows. In such state that the recording-medium housing case has been inserted into the recording and/or reproducing apparatus, said locking member comes into engagement with said engaging portion formed in the case, whereby said case is prevented from being ejected in the direction opposite to the inserting direction, and when said case is moved to its recording or reproducing position, said locking member is unlocked from locking engagement with the engaging portion and then said locking member is moved to the position where it cannot come into reengagement with the engaging portion. At the time of unloading, the locking member is held in unlocked state.

BRIEF DESCRIPTION OF THE DRAWINGS

The drawings illustrate an embodiment of the device for loading recording-medium housing case according to the present invention, in which:

FIG. 2 is a sectional view of a recording and/or reproducing apparatus, illustrating loading or unloading of the cassette;

FIG. 4 is a sectional view of the recording and/or reproducing apparatus in which the cassette has been moved to its recording or reproducing position.

DETAILED DESCRIPTION OF THE PREFERRED EMBODIMENT

Now, the invention will be described, with reference to the drawings which illustrate a preferred embodiment of the present invention.

Figure 1:
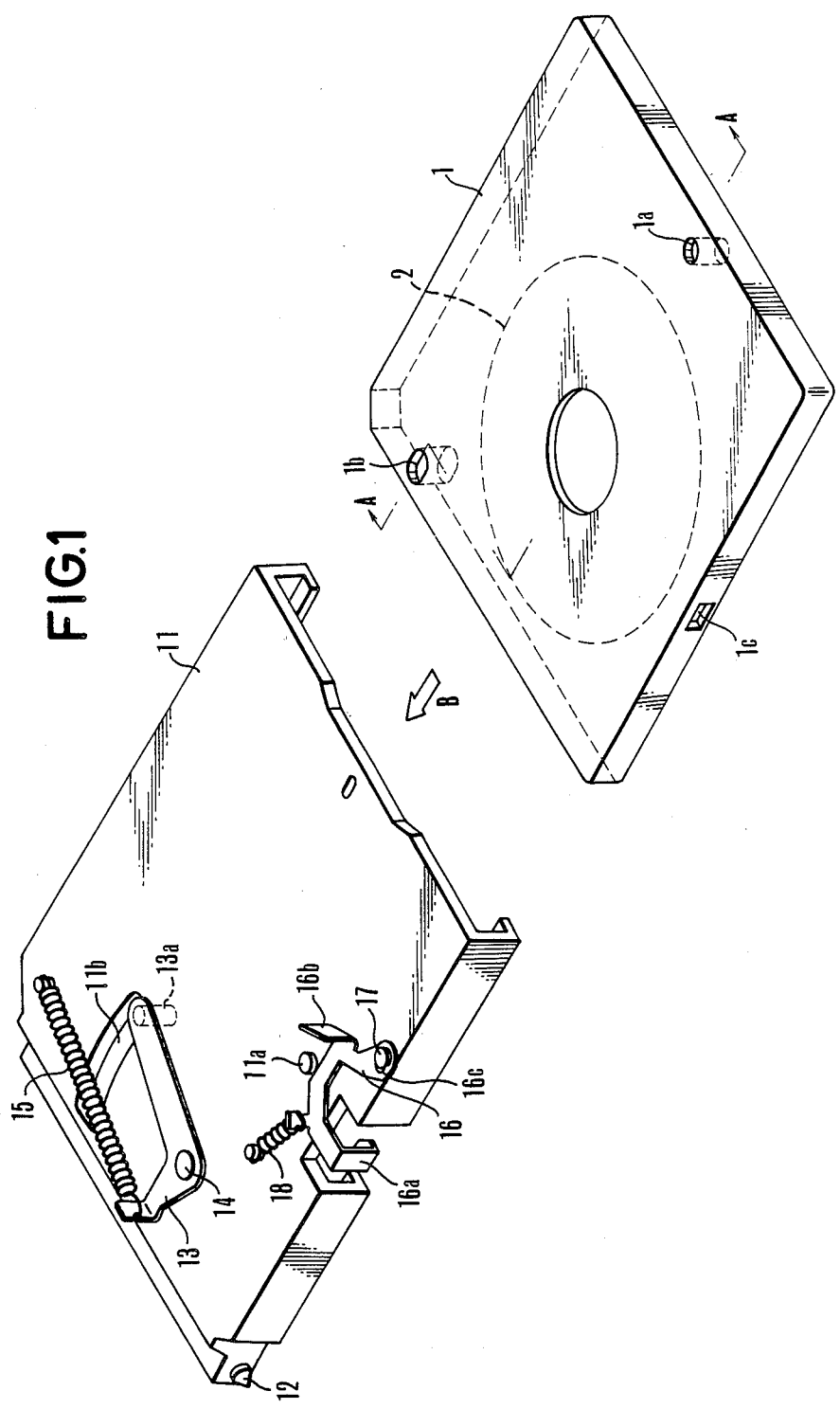
FIG. 1 is a perspective view showing a cassette and a cassette holder in the state where the cassette has not been inserted into the cassette holder.

FIG. 1 illustrates a cassette and a cassette holder according to an embodiment of the present invention. In FIG. 1, the cassette is indicated by the numeral 1 and a rotary magnetic disc 2, which forms a recording medium, is housed in said cassette. The cassette 1 is formed with holes 1a and 1b for positioning the cassette relative to the recording and/or reproducing apparatus and it is further formed with an engaging recess portion 1c.

Figure 3:
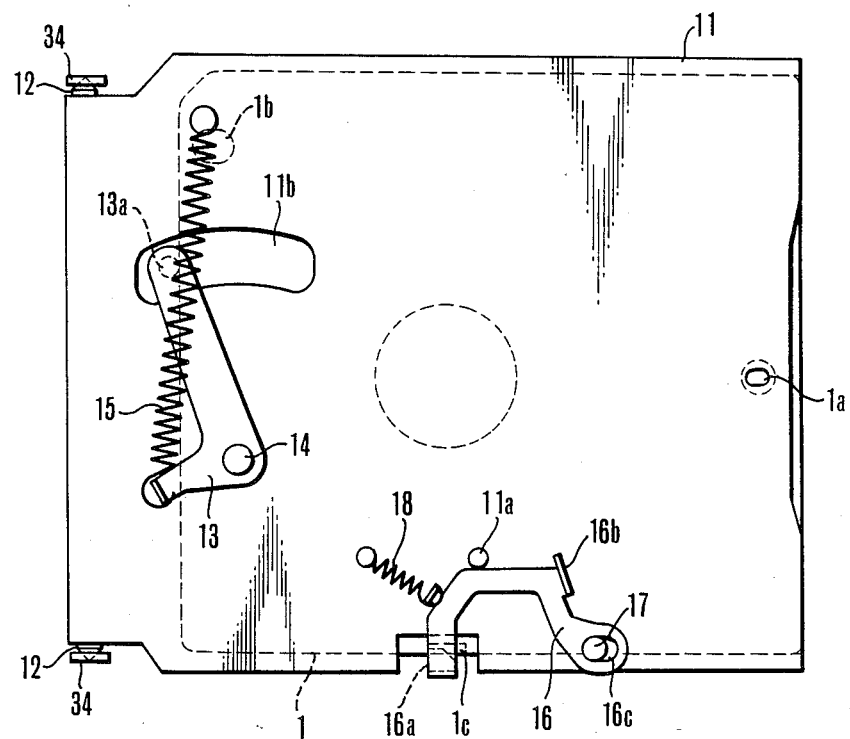
FIG. 3 is a plan view showing the state where the cassette has been inserted into the recording and/or reproducing apparatus as shown in FIG. 2.

The cassette holder in the recording and/or reproducing apparatus is indicated by the numeral 11 and it is pivotally supported by means of axes 12 and hinges 34 (FIG. 3). An arrow B in FIG. 1 and FIG. 2 indicates a direction of inserting the cassette 1 into the cassette holder 11. The numeral 13 designates an ejecting lever, which is energized in clockwise direction around an axis 14 by means of a spring 15. When the cassette 1 has been inserted into the cassette holder 11, an energizing force produced by the spring 15 is applied to a pin 13a fixed on the ejecting lever 13. This energizing force acts on the cassette in the direction opposite to the direction of the arrow B, namely, in the cassette ejecting direction. The cassette holder 11 has an arcuate slot 11b formed in the upper wall thereof, which serves to guide said pin 13a.

The numeral 16 designates a locking lever arranged on said cassette holder. A slot 16c is formed in the cassette holder and, a locking lever 16, rotatable about an axis 17 is slidably engaged in said slot. The locking lever 16 is subjected to energizing force of a spring 18. This spring 18 acts to slide said lever in the direction of the arrow B and at the same time it acts to rotate said lever in the clockwise direction. The energizing force produced by the spring 18 is predetermined to be weaker than the force produced by the spring 15. The rotation of the locking lever 16 in its clockwise direction is limited by a pin 11a fixed on the cassette holder 11. The locking lever 16 is provided with a hook portion 16a which is arranged to come into engagement with the engaging recess portion 1c of the cassette 1, and it is further provided with a standing portion 16b. The function of this standing portion will be hereinafter described, with reference to FIGS. 4 and 5.

FIG. 2 is a sectional view substantially taken along a line A—A in FIG. 1, showing the essential parts of the recording and/or reproducing apparatus according to the embodiment of the present invention. In FIG. 2, a cover member 31 is shown in its opened position for loading the cassette 1. The numeral 21 designates a recording and/or reproducing apparatus, which has pins 22 and 23 fixed thereon, and these pins are arranged to come into engagement with the positioning holes 1a and 1b of the cassette, respectively. The recording and/or reproducing apparatus has a spindle 24 for driving the magnetic disc 2. The spindle 24 is connected to a driving motor (not shown).

The cover member 31 for covering the recording and/or reproducing apparatus is rotatably supported by an axis 32. The cover member 31 and the cassette holder 11 are arranged to hold a predetermined angular relationship as shown in FIG. 2, by well-known means including spring, link or the like (not shown). The numeral 33 indicates a pin which is arranged to come into contact with the standing portion 16b of the locking lever 16 and press the same when the cover member 31 is closed.

FIG. 3 is a plan view of the device shown in FIG. 2 in which the cassette 1 has been inserted in the direction of the arrow B. In this state, the cassette 1 is subjected to the ejecting force owing to the spring 15, which acts in the rightward direction in FIG. 3, but the ejection of said cassette 1 is prevented owing to the engagement of the hook portion 16a of the locking lever 16 with the recess portion 1c of the cassette 1. Accordingly, the locking lever 16 is held in position where it is biased toward the right along the slot 16c in FIG. 3.

After the cassette 1 has been inserted into the cassette holder 11, the cover member 31 is pushed downwardly to move the cassette to its recording or reproducing position. At this stage, the cassette holder 11 and the cover member 31 are rotated in the clockwise direction around the axes 12 and 32, respectively, and the cassette 1 is positioned relative to the recording and/or reproducing apparatus 21 under the action of the positioning pins 22 and 23. At the same time, a central hub portion 2a of the magnetic disc 2 comes into fitting engagement with the spindle 24. The opening angle between the cover 31 and the cassette holder 11 is absorbed by any well-known means including spring, link or the like (not shown), until they come to the positions as shown in FIG. 4, and they are held in locked state by a well-known mechanism (not shown).

Figure 5:
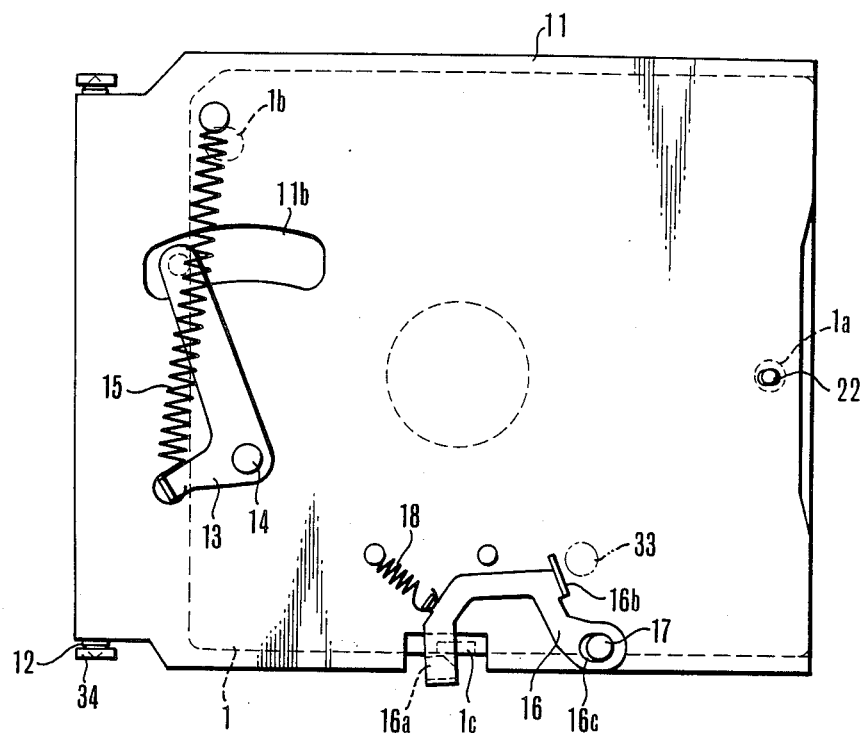
FIG. 5 is a plan view of the apparatus as shown in FIG. 4.

During the above process, the pin 33 fixed on the cover 31 is lowered. The standing portion 16b of the locking lever 16 is pressed firstly by the tapered portion of the pin 33 and finally by the cylindrical portion of said pin, so that the locking lever 16 is rotated in counterclockwise direction. Thus the hook portion 16a of the lever 16 is unlocked from locking engagement with the recess portion 1c of the cassette 1, as shown in FIG. 5. The locking lever 16 is also energized in the inserting direction by the action of the spring 18, so that the cassette 1 is moved in the inserting direction along the slot 16c. At this stage, the hook portion 16a of the locking lever 16 comes to an inactive positron where it cannot come into reengagement with the recess portion 1c of the cassette 1. At the time of unloading of the cassette 1, the locking member is held in the locked state, i.e., its unlocked condition is maintained.

At the time of unloading the cassette 1 from the recording and/or reproducing apparatus, the cover member 31 is unlocked and it is returned to its position shown in FIG. 2 by the action of a spring or the like (not shown). The cassette 1 has been already unlocked from locking engagement with the locking lever 16, as described above. Although the cassette 1 is subjected to the energizing force in the ejecting direction by the spring 15, the pin 23 fixed on the recording and/or reproducing apparatus 21 holds its engaging relation with the positioning hole 1b of the cassette 1 until the time just before it comes to the position shown in FIG. 2, where the cassette 1 becomes disengaged from the pin 23. Thus, the cassette 1 becomes partly exposed from the cassette holder 11 by the action of the energizing force of the spring 15, when it has come to the position shown in FIG. 2.

It will be understood from the above explanation that the present invention provides a device for loading a recording-medium housing case in a recording and/or reproducing apparatus which is so constructed that in the state where the recording-medium housing case has been inserted into the recording and/or reproducing apparatus, the locking member having the hook portion comes into locking engagement with the engaging portion formed in the recording-medium housing case, thereby preventing the ejection of said case in the direction opposite to the case inserting direction; and when said case is moved to its recording or reproducing position, the locking member is unlocked from the locking engagement with the engaging portion while said locking member is moved to its position where it cannot come into reengagement with said engaging portion, depending upon the movement of said case. Thus the present invention provides the device which is simple in construction and reliable in operation, particularly in operation of unloading the recordingmedium housing case from the recording and/or reproducing apparatus, in which few restrictions in construction, precision or space exist between the constituent members of the device. This device is particularly suitable to decrease the overall size of the recording and/or reproducing apparatus.

What is claimed is:

1. A device for loading a recording-medium housing case in an apparatus, said case having an engaging portion formed therein, said device comprising:
   (a) holder means supported by said apparatus for movement between a first position for receipt of said case and a second position at which said case is disposed in a predetermined position in said apparatus for effecting recording or reproducing;
   (b) cover means supported by said apparatus for movement between an open position and a closed position, said cover means in said closed position thereof being adapted to cover said holder means with said holder means in said second position thereof;
   (c) a locking member having a portion engageable with said case engaging portion for locking said case in said holder means;
   (d) means for energizing said locking member in the course of inserting said case in said holder means into locking engagement with said case engaging portion when said case has been inserted into said holder means;
   (e) a positioning member for positioning said case at said predetermined position; and
   (f) unlocking means arranged on said cover means for unlocking said locking member from such locking engagement with said case engaging portion and moving said locking member to an inactive position thereof where it cannot come into reengagement with said case engaging portion, said unlocking means being arranged to unlock said locking member in accordance with movement of said cover means in only one direction from said open position to said closed position thereof, and said locking member being maintained in said inactive position thereof after said case has been brought to said predetermined position by said holder means and has been positioned therein by said positioning member.

2. A device according to claim 1, further comprising ejecting means for ejecting said recording medium housing case from said apparatus.

3. A device according to claim 1, in which a recording medium housed in said recording-medium housing case includes a magnetic recording medium.

4. A device according to claim 3, in which said magnetic recording medium is a magnetic disc.

5. A device according to claim 1, wherein said holder means is pivotally mounted in the apparatus.

6. A device according to claim 5, in which said locking member is supported by said holder means.

7. A device according to claim 5, in which said energizing means is supported by said holder means.

8. A device according to claim 1, in which said unlocking means is supported by said cover member.

9. A device for loading a recording-medium housing case in a recording and/or reproducing apparatus, comprising:
   (a) a holder member which is movable to a first position and a second position relative to said apparatus, said holder member being adapted to accept a recording-medium from outside of the device in its first position and being adapted to move such accepted recording-medium into said apparatus in its second position;
   (b) a cover member supported for movement relative to said apparatus in one direction from an open position separated from said holder member toward said holder member in said first position thereof to a closed position in which said cover member covers said holder member with said holder member in said second position;
   (c) locking means for locking for locking the recording-medium in the holder as the recording-medium is loaded into the holder member; and
   (d) unlocking means arranged on said cover member for releasing the locking of said locking means just before said cover member reaches said second position after said holder member has moved to said second position and responsively to movement of said cover only in said one direction to said closed position thereof.

10. A device according to claim 9, in which said recording-medium includes a recording medium and a case covering said medium.

11. A device according to claim 9, further comprising ejecting means for ejecting said recording-medium.

12. A device according to claim 11, in which said ejecting means includes an elastic member which is adapted to be charged as said recording medium is loaded into the loading device.

13. A device according to claim 9, further comprising positioning means for positioning said case within said holder member at a predetermined position at which a recording or a reproducing can be made with said holder member positioned at said second position.

14. A device according to claim 9, in which said unlocking means is supported by said cover member.

15. A device for loading a recording-medium housing case in an apparatus, said case containing said recording-medium and having top and bottom panels, a front wall, a rear wall and sidewalls extending between said top and bottom panels, with an engagement slot in one of said sidewalls, said case including a registration aperture extending through said bottom panel, said apparatus including a registration pin and a pivotal support member, said device comprising:
   (a) a cassette holder supported by said apparatus pivotal support member for rotational movement between a first position relative to said apparatus for receiving and ejecting said case and a second position relative to said apparatus wherein said registration pin is in residence in said registration aperture;
   (b) a control member for moving said cassette holder in one direction from said first position to said second position;
   (c) a locking member having a hook means for selective engagement and disengagement with said case engagement slot; and
   (d) means supporting said locking member for rotational movement for effecting engagement of said locking member with said case engagement slot when said cassette holder is in said first position thereof and further supporting said locking member for translational movement for effecting disengagement of said locking member with said case engagement slot when said cassette holder is in said second position by movement of said control means only in said one direction.

16. A device according to claim 15, wherein said means (c) translational movement is to an extent giving rise to misregistration of said locking member and said case engagement slot precluding reentry of said locking member therein in said second position of said cassette holder.

17. A device according to claim 15, said control member including a cover member overlying said cassette holder and supported for movement into engagement therewith, said cover member including means for imparting said translational movement to said locking member upon such cover member into engagement with said cassette holder.

18. A device according to claim 17 wherein said cover member comprises a tapered member depending therefrom and wherein said locking member includes an upstanding part in interference path with said tapered member, when said cover member is closed to be overlying said cassette holder.

19. A device for loading a recording-medium housing case in an apparatus, said case containing said recording-medium and having top and bottom panels, a front wall, a rear wall and sidewalls extending between said top and bottom panels, with an engagement slot in one of said sidewalls, said case including a registration aperture extending through said bottom panel, said apparatus including a registration pin and a pivotal support member, said device comprising:

(a) a cassette holder supported by said apparatus pivotal support member for rotational movement between a first position relative to said apparatus for receiving and ejecting said case and a second position relative to said apparatus wherein said registration pin is in residence in said registration aperture;

(b) a cover overlying said cassette holder and supported by said apparatus for movement into engagement with said cassette holder, said cover including an operating element dependent therefrom, said cover being arranged to move in one direction and to displace said cassette holder from said first position to said second position in the course of its movement;

(c) a locking member having a hook means for selective engagement and disengagement with said case engagement slot; and (d) means supporting said locking member for rotational movement for effecting engagement of said locking member with said case engagement slot when said cassette holder is in said first position thereof and operative with said cover operating element and said locking member for effecting disengagement of said locking member with said case engagement slot when said cassette holder is in said second position, by movement of said cover only in said one direction.

20. A device according to claim 19 wherein said cover member operating element comprises a tapered member and wherein said locking member includes an upstanding part in interference path with said cover member member.

21. A device according to claim 19, in which said ejecting means includes an elastic member which is adapted to be charged as said case is loaded into said holder means.

* * * * *